3,385,800
POLYMERIZATION OF ALKYLENE OXIDES BY A CATALYST SYSTEM COMPRISING ORGANOMETALLIC COMPOUNDS IN COMBINATION WITH AN OXYGEN-CONTAINING COCATALYST
Junji Furukawa, Sakyo-ku, Kyoto, Teiji Tsuruta, Fushimi-ku, Kyoto, Takeo Saegusa, Kita-ku, Kyoto, and Ryozo Sakata, Kakogawa-cho, Kakogawa, Japan, assignors to The General Tire & Rubber Company, a corporation of Ohio
No Drawing. Filed Nov. 20, 1959, Ser. No. 854,257
Claims priority, application Japan, Nov. 24, 1958, 33/33,458, 33/33,459
7 Claims. (Cl. 260—2)

ABSTRACT OF THE DISCLOSURE

A process is disclosed for producing an epoxide polymer which comprises polymerizing an alkylene oxide at about −10° to 200° C. in the presence of about 0.02 to 10 mole percent of a catalyst of an organometallic compound of the formula $MRR'_{x-1}$ where M is a metal selected from Groups I, II or III of the Periodic Table, where R is a hydrocarbon radical having from 1 to 10 carbon atoms, where each R' is a member selected from the class consisting of a hydrogen atom, a halogen atom, a hydrocarbon radical of 1 to 10 carbon atoms, an alkoxy radical and a secondary amino radical and where $x$ is the valency of the metal M and a cocatalyst consisting of controlled amounts of water, alcohol or oxygen or various combinations of these cocatalysts.

---

The present invention pertains to the method of producing polymers and copolymers of alkylene oxides by means of using a catalyst system which consists of an organometallic compound in combination with a certain kind and amount of a cocatalyst or cocatalysts.

One of the objects of the invention is to provide an improved and more efficient catalyst system for polymerizing alkylene oxides which permits higher conversion and higher yield and under less rigorous temperature and pressure conditions than previously known. It is also an object of this invention to produce new and useful polymers and copolymers and mixtures of copolymers which are characterized by higher molecular weight than suspected or known possible heretofore.

The cocatalysts proposed in the present invention are water, alcohol and oxygen.

Many polymerization catalysts for alkylene oxides are known, and methods of polymerizing alkylene oxides by using either an organometallic compound alone or together with certain kinds of metal halide cocatalysts are also known. For instance, British Patent No. 785,229 and U.S. Patent No. 2,870,100 propose the polymerization of ethylene oxides and propylene oxide by organometallic compounds of aluminum, zinc and magnesium. While, compounds of aluminum, zinc and magnesium. While British Patent No. 793,065 proposes the copolymerization of two or more kinds of alkylene oxides by an organometallic compound alone. Further, the examples in which the organometallic compound is used together with a certain cocatalyst are seen in the triethyl aluminum and ferric chloride system [S. Kambara and M. Hatano, Journal of Polymer Science, vol. 27, page 584 (1958)] and in the trialkyl aluminum and sodium fluoride system (British Patent No. 799,955).

Thus, the polymerization of alkylene oxides can be induced by organometallic compounds alone. However, when the cocatalysts proposed in the present invention are used, its activity is remarkably strengthened and moreover, the degree of polymerization of the polymer to be produced becomes far higher as compared with the case of organometallic compound alone or the case of using it together with generally-known cocatalysts as above-mentioned.

It would seem that substances such as water, alcohol and oxygen which react with organometallic compounds would decrease the catalytic activity of the organometallic compound to which they are added. However, when used in definite controlled amounts, the results are surprisingly to the contrary. By using these cocatalysts in the optimum ratio to the primary catalyst, an organometallic compound, a very active catalyst system becomes available. It is surprising that its activity is far stronger than when using the organometallic compound alone. For example, diethylzinc by itself is an ineffective polymerization catalyst at room temperature for propylene oxide. However, when used together with an amount of oxygen equivalent to about 50 mole percent or with water equivalent to about a 100 mole percent, or with methanol equivalent to about 150 mole percent based on the diethylzinc, propylene oxide is easily polymerized even at room temperature and a polymer with a very high degree of polymerization is produced. Thus, by means of adding an optimum quantity of certain materials which are generally supposed to destroy an organometallic compound its catalytic activity is increased to a remarkable extent. This is an unanticipated result.

The organometallic compound to be used in the present invention is the organic compound of a metal selected from Groups I, II and III of the Periodic Table and is shown by the general formula $MeRR'_{x-1}$, where Me is a metal element of valency $x$; R is a hydrocarbon radical; each R' is a member of the class consisting of a hydrogen atom, a halogen atom, a hydrocarbon radical, an alkoxy radical and a secondary amino radical. The amount of these organometallic compounds used can be varied over a very wide range. Although 0.02–10.0 mole percent of the organometallic compound based on the alkylene oxide can be used, the preferred range is about 0.05 to 5.0 mole percent. It is also possible to use a mixture of two or more kinds of organometallic compounds or the so-called "ate-complex" which is supposed to be composed of two kinds of organometallic compounds.

The ratio of the cocatalyst to the organometallic compounds must be strictly controlled. Although the detailed explanation about optimum amounts is given later in the examples of the experiments, it is approximately 10–200 mole percent base on diethylzinc in the case of oxygen and approximately 150–250 mole percent base on diethylzinc in the case of alcohol and approximately 10–150 mole percent base on diethylzinc in the case of water. It is realized that the above ratios will vary somewhat depending upon the conditions of reaction. Alkylene oxide monomers include ethylene oxide, propylene oxide, butadiene monoxide and oxides of other olefins. Homopolymerization of one kind of alkylene oxide or the copolymerization of more than one kind of alkylene oxide is possible by the use of the invention herein described.

Solvents are not necessary in the practice of the present invention; however, their use may facilitate control of the polymerization. Among the solvents found suitable are aliphatic hydrocarbons such as hexane and heptane, aromatic hydrocarbons such as benzene and toluene, and various other solvents such as ether which are inert to the reaction reagents especially, to organometallic compound.

The cocatalyst and the organometallic compound are mixed together and allowed to react either before or after the monomer is added. There are many various ways in which the reaction can be run. Modifications are then made in order to balance the system.

The temperature of polymerization can be varied over a wide range such as between about −10° and 200° C. However we prefer to conduct the polymerization between approximately 0° and 100° C.

General procedure by which the present invention comes into effect is as follows:

The procedure used consisted in dissolving the organometallic compound into the solvent, to which was then added the desired amount of cocatalyst. In case of using oxygen, the desired amount of oxygen gas or equivalent dry air is injected into the reaction system, permitting them to react. Monomer is then added and the polymerization is allowed to proceed.

In some cases the organometallic compound is added to the mixture of cocatalyst and monomeric alkylene oxide, or the cocatalyst is added to the mixture of monomeric alkylene oxide and the organometallic compound in hydrocarbon solvent.

After the polymerization the polymer is extracted with a suitable solvent which contains enough water or methanol to destroy the catalyst completely. The polymer in solution is then precipitated by adding it to a nonsolvent. The polymer thus obtained is dried in vacuo at room temperature.

With regard to the polymer thus produced, the viscosity of benzene solution of various concentration is obtained at 30° C. and the intrinsic viscosity, $[\eta]$ (dl./g.) is obtained by extrapolation.

It is understood, however, that the present invention is never limited to the methods explained above and that it is possible to change or improve the procedure without exceeding the limit of the patent claims on the present invention.

These novel polymers and copolymers of the present invention may be used for the thickening of polyalkylene oxide lubricants and also may be used for the production of rubber-like compounds to be used for the production of vehicle tires, calking compounds, etc. These materials by the use of certain peroxide and sulfur combinations can be vulcanized even though essentially saturated and when they contain unsaturated linkages they are vulcanizable with sulfur and accelerators such as employed with commercial polymers like natural rubber, butyl rubber, etc.

EXAMPLE 1

White elastic mass (1.23 g.) is produced by means of reacting 3.5 ml. of hexane and 3.5 ml. (0.05 mole) of propylene oxide into a test tube of 45 ml. with a ground stopper, after flushing the test tube with nitrogen, and adding 0.3 g. (0.0025 mole) of diethylzinc, and then replacing the nitrogen inside the test tube by air (30 ml. of oxygen corresponds to about 50 mole percent of diethylzinc), connecting the container with another empty container which has a capacity of about 110 ml. and finally keeping the mixture at room temperature for 5 days.

Table 1 shows the result of this series of experiments as well as the yield of monomer, conversion percent and $[\eta]$ at 30° C. in benzene.

TABLE 1.—POLYMERIZATION OF PROPYLENE OXIDE BY DIETHYLZINC AND OXYGEN
[5 days at room temperature]

| Oxygen mole percent based on Zn $(C_2H_5)_2$ | Polymer yield, gms. | Conversion percent | $\eta$ |
| --- | --- | --- | --- |
| 0 | 0 | 0 | |
| 10 | Trace | | |
| 30 | 0.173 | 6.0 | 1.2 |
| 50 | 1.232 | 42.5 | 2.5 |
| 150 | 0.336 | 11.6 | 1.8 |
| Large | 0 | 0 | |

EXAMPLE 2

3.5 ml. of n-hexane is placed in a 45 ml. test tube, flushed with nitrogen and 3.2 g. of methanol and 0.31 g. (0.0025 mole) of diethylzinc are added to it. After the mixture is kept at room temperature for 18 hours, 3.5 ml. (0.05 mole) of propylene oxide is added to the mixture and polymerization is carried out at room temperature for 7 days.

Polypropylene oxide is extracted with benzene containing about 3 ml. of methanol and the solvent is removed below 50° C. in vacuo. The polymer is dissolved in hot acetone again and is precipitated in water and dried in vacuo at 50° C. to the constant weight. 1.5 g. of a white elastic mass is obtained, conversion 54%, whose intrinsic viscosity is 1.40. Table 2 shows the result of examples in which all the conditions are the same as in the above-mentioned example with the exception of changes in the amount of methanol which is reacted with diethylzinc before the addition of propylene oxide.

TABLE 2.—POLYMERIZATION OF PROPYLENE OXIDE BY DIETHYLZINC AND METHANOL
[7 days at room temperature]

Methanol/Zn$(C_2H_5)_2$
(mole/mole): Yield (percent)
 0.5 _____ 0
 1.0 _____ 0
 1.5 _____ 17.1
 2.5 _____ 5.2

EXAMPLE 3

As a cocatalyst ethanol is used instead of methanol. Polymerization is carried out under the same condition as in Example 2. The results are shown in Table 3.

TABLE 3.—POLYMERIZATION OF PROPYLENE OXIDE BY DIETHYLZINC AND ETHANOL
[7 days at Room Temperature]

| Ethanol/Zn $(C_2H_5)_2$ (mole/mole) | Yield (percent) | Intrinsic Viscosity |
| --- | --- | --- |
| 0.5 | 0 | |
| 1.0 | 5.8 | |
| 1.5 | 15.3 | 1.20 |
| 2.0 | 0 | |
| 2.5 | 0 | |

EXAMPLE 4

A small amount of polymer is produced by means of adding 0.31 g. (0.0025 mole) of diethylzinc to 3.5 ml. of hexane under nitrogen atmosphere in the same capacity test tube as used in Example 1, replacing nitrogen inside the test tube by air, keeping it at room temperature for 2 days, then adding 3.5 ml. of propylene oxide, exchanging the air inside the test tube with nitrogen, and finally holding the reaction mixture at room temperature for 50 hours.

EXAMPLE 5

Non-sticky white polymer (2.27 g.) is produced by means of putting 3.5 ml. of hexane and 3.5 ml. of propylene oxide into the same capacity test tube as used in Example 1, adding water (0.0025 mole), replacing the air inside the tube by nitrogen, adding 0.31 g. (0.0025 mole) of diethylzinc, and finally holding the reaction mixture at room temperature for 24 hours. The polymer is produced in the yield of 78% and $[\eta]=5.4$ at 30° C.

Table 4 shows the result of this example as well as the result of the polymerization of propylene oxide in case of leaving all the polymerization conditions the same as in the abovementioned example with the exception of varying the amount of water.

TABLE 4.—POLYMERIZATION OF PROPYLENE OXIDE BY DIETHYLZINC AND WATER
[Propylene oxide 3.5 ml., diethylzinc 0.31 g, hexane 3.5 ml. Room temperature for 24 hours]

| Ml. | Water, mol percent for Zn $(C_2H_5)_2$ | Polymer (g.) | Conversion (percent) | $(\eta)$ |
| --- | --- | --- | --- | --- |
| 0 | 0 | 0 | 0 | |
| 0.011 | 25 | trace | | |
| 0.023 | 50 | 0.31 | 10 | 2.3 |
| 0.046 | 100 | 2.27 | 78 | 5.4 |
| 0.090 | 200 | 0 | 0 | |
| 0.140 | 300 | 0 | 0 | |

What we claim as our invention:

1. The method for the production of a solid polyalkylene ether which comprises contacting under polymerizing conditions at a temperature of from about −10 to 200° C. a monomeric polymerizable alkylene oxide having a ring of one oxygen atom and two carbon atoms with a polymerization catalyst consisting of (A) a compound having the formula $MRR'_{(x-1)}$ where M is zinc, R is a hydrocarbon radical having from 1 to 10 carbon atoms, R' is selected from the group consisting of a hydrogen atom, a halogen atom, a hydrocarbon radical of from 1 to 10 carbon atoms, an alkoxy radical and a secondary amino radical, and $x$ is the valency of M, and (B), as a cocatalyst, an oxygen containing material selected from the group consisting of dry air and oxygen, said oxygen containing material being used in an amount, based on said compound, equal to 10 to 200 mol percent of oxygen, and said compound being used in an amount of from 0.02 to 10 mol percent based on said alkylene oxide.

2. The method according to claim 1 where the temperature is from about 0 to 100° C. and said oxygen containing material is used in an amount, based on said compound of from 30 to 150 mol percent.

3. The method according to claim 2 where said compound is used in an amount of from about 0.05 to 5.0 mol percent based on said alkylene oxide.

4. The method according to claim 2 where R' is an alkyl radical of from 1 to 10 carbon atoms.

5. The method according to claim 4 where said compound is zinc diethyl and the cocatalyst is oxygen.

6. The method according to claim 1 where said catalyst is the reaction product of A and B.

7. The method according to claim 1 where the polymerization is conducted in admixture with an inert solvent.

References Cited

UNITED STATES PATENTS

| | | | |
|---|---|---|---|
| 2,641,614 | 6/1953 | Britton et al. | 260—2 |
| 2,870,099 | 1/1959 | Borrows et al. | 260—2 |
| 2,870,100 | 1/1959 | Stewart et al. | 260—2 |
| 3,026,270 | 3/1962 | Robinson | 260—2 |
| 3,058,922 | 10/1962 | Vandenburg | 260—2 |
| 2,989,487 | 6/1961 | Truett | 252—431 |
| 3,038,863 | 6/1962 | Balthis et al. | 252—431 |

FOREIGN PATENTS 220,517  2/1959  Australia.

OTHER REFERENCES

Colclough et al.: "The Polymerization of Epoxides by Metal Halide Catalysts," J. Poly. Sci., vol. XXXIV, pp. 171–179, No. 127, January 1959.

Furukawa et al.: J. Poly. Sci., vol. 36, paragraphs 541–3 (April 1959).

Furukawa et al.: Die Makromolekulare, vol. 32, pp. 90–94, July 1959.

Whitmore, "Organic Chemistry," second edition, pp. 854–855 relied on, May 1951.

WILLIAM H. SHORT, *Primary Examiner.*

M. STERMAN, LOUISE P. QUAST, J. R. LIBERMAN,
*Examiners.*

T. D. KERWIN, R. A. BURROUGHS, T. E. PERTILLA,
*Assistant Examiners.*